(12) United States Patent
Fontaine et al.

(10) Patent No.: US 10,693,835 B2
(45) Date of Patent: Jun. 23, 2020

(54) METHOD OF FORWARDING DATA BETWEEN IP DEVICES

(71) Applicant: Orange, Paris (FR)

(72) Inventors: Fabrice Fontaine, Geveze (FR); Flavien Moullec, Cesson Sevigne (FR)

(73) Assignee: ORANGE, Paris (FR)

( * ) Notice: Subject to any disclaimer, the term of this patent is extended or adjusted under 35 U.S.C. 154(b) by 0 days.

(21) Appl. No.: 15/508,062

(22) PCT Filed: Aug. 31, 2015

(86) PCT No.: PCT/FR2015/052302
§ 371 (c)(1),
(2) Date: Mar. 1, 2017

(87) PCT Pub. No.: WO2016/034799
PCT Pub. Date: Mar. 10, 2016

(65) Prior Publication Data
US 2017/0302620 A1    Oct. 19, 2017

(30) Foreign Application Priority Data
Sep. 2, 2014   (FR) ..................... 14 58193

(51) Int. Cl.
*H04L 29/12* (2006.01)

(52) U.S. Cl.
CPC ...... *H04L 61/2007* (2013.01); *H04L 61/2015* (2013.01); *H04L 61/2038* (2013.01);
(Continued)

(58) Field of Classification Search
None
See application file for complete search history.

(56) References Cited

U.S. PATENT DOCUMENTS

| 2006/0146742 A1* | 7/2006 | Kawahara ......... H04L 29/12009 370/328 |
| 2008/0043758 A1* | 2/2008 | Giaretta .................. H04L 63/08 370/400 |

(Continued)

FOREIGN PATENT DOCUMENTS

WO   WO 2004/064334   7/2004

OTHER PUBLICATIONS

Shelby, et al., Neighbor Discovery Optimization for IPv6 over Low-Power Wireless Personal Area Networks (6LoWPANs), Internet Engineering Task Force (IETF), Nov. 6, 2012, pp. 1-55.
(Continued)

*Primary Examiner* — Yaotang Wang
(74) *Attorney, Agent, or Firm* — Knobbe, Martens, Olson & Bear, LLP

(57) ABSTRACT

One embodiment relates to data routing using first and second pieces of IP type equipment, the second piece of equipment being suitable for communicating with a management node of a sensor network. The sensors may have respective IP addresses that are generated by said management node, the node also having a function of routing data in the sensor network. The method includes, in a router, generating an address for the second piece of equipment, verifying the availability of the address in the sensor network from the management node, and if the address is available, requesting the management node to add the second piece of equipment in the sensor network.

7 Claims, 4 Drawing Sheets

(52) U.S. Cl.
CPC ...... *H04L 61/2046* (2013.01); *H04L 61/2053* (2013.01); *H04L 61/6059* (2013.01); *H04L 61/6081* (2013.01)

(56) References Cited

U.S. PATENT DOCUMENTS

2014/0167979 A1* 6/2014 Soma ..................... H04O 9/00
 340/870.02
2015/0264580 A1* 9/2015 Iwai ..................... H04W 76/12
 370/329

OTHER PUBLICATIONS

International Search Report dated Dec. 23, 2015 for International Application No. PCT/FR2015/052302 filed Aug. 31, 2015, 7 pages.
Written Opinion dated Dec. 23, 2015 for International Application No. PCT/FR2015/052302 filed Aug. 31, 2015, 6 pages.

* cited by examiner

```
   Format of a DHCPv6 message:

0                   1                   2                   3
    0 1 2 3 4 5 6 7 8 9 0 1 2 3 4 5 6 7 8 9 0 1 2 3 4 5 6 7 8 9 0 1
   +-+-+-+-+-+-+-+-+-+-+-+-+-+-+-+-+-+-+-+-+-+-+-+-+-+-+-+-+-+-+-+-+
   |    msg-type   |               transaction-id                  |
   +-+-+-+-+-+-+-+-+-+-+-+-+-+-+-+-+-+-+-+-+-+-+-+-+-+-+-+-+-+-+-+-+
   |                                                               |
   .                            options                            .
   .                           (variable)                          .
   |                                                               |
   +-+-+-+-+-+-+-+-+-+-+-+-+-+-+-+-+-+-+-+-+-+-+-+-+-+-+-+-+-+-+-+-+ msg-type            Identifies the DHCP message type; the
                       available message types are listed in
                       section 5.3.

transaction-id      The transaction ID for this message exchange.

options             Options carried in this message; options are
                       described in section 22.

msg-type: SOLICIT=1, ADVERTISE=2, REQUEST=3, REPLY=7,
RELEASE(8)
```

Figure 6

METHOD OF FORWARDING DATA BETWEEN IP DEVICES

RELATED APPLICATIONS

This application is the U.S. National Phase of Application No. PCT/FR2015/052302 entitled "METHOD OF FORWARDING DATA BETWEEN IP DEVICES" filed Aug. 31, 2015, which designated the United States, and which claims the benefit of French Application No. 1458193 filed Sep. 2, 2014.

The invention relates to a method of routing data between pieces of equipment that operate on the basis of the Internet protocol (IP), and referred to below as "IP equipment".

It should be recalled that a residential network is a computer network that connects together, with or without wires, IP equipment terminals in a residence (computers, digital TV decoder, printer peripherals, storage peripherals, etc.) that are suitable for communicating with one another. A residential network includes router equipment, also commonly referred to as a residential gateway, or more simply as a gateway, constituting an intermediate element that serves to redirect or route data packets between the various terminals and networks that are connected thereto.

By way of example, the above-mentioned pieces of IT equipment may be the residential gateway and the digital television decoder.

In such a network, a terminal usually has an Ethernet type interface enabling it to dialog in wired mode over the network using an IP type communications protocol, and a WiFi interface for dialoging wirelessly using the same IP protocol.

Those interfaces consume a large amount of energy.

Present residential networks are experiencing the appearance of more and more networks of sensors. These networks of wireless IP sensors are presently experiencing unprecedented expansion in various fields such as producing and using electricity (Smart Grid), telemedicine, the automobile industry (intelligent vehicles), etc. This is made possible by the arrival of various technological standards dedicated to communications in networks of sensors. The sensors exchange messages in compliance with a "low energy" standard over a radio channel. Amongst these "low energy" standards, mention may be made by way of example of the ZigBee protocol (a protocol that enables communication to take place over a radio link in local networks with low consumption), the "DECT ultra low energy" standard (abbreviated DECT ULE, which is an extension of the DEC wireless communications standard to low energy applications), or indeed the "Bluetooth low energy" standard (abbreviated BLE, for the purpose of providing a reduction in power compared with conventional applications in compliance with the Bluetooth standard). Networks implementing these various standards consume little energy. Below, reference is made to the generic term "low consumption networks" or indeed to "IPv6 low power wireless personal area networks" (6LoWPAN).

The inventors have observed that, at present, equipment of IP type (e.g. IPv4 or IPv6) that does not implement the 6LoWPAN standard, such as a digital TV decoder, cannot join a network of 6LoWPAN sensors in order to transmit data to another piece of IP equipment via the sensor network.

The only possibility made available by existing protocols is to be able to connect a piece of IP equipment to the 6LoWPAN network "exit point" (or the "low power and lossy network border" router (LBR) in the terminology of the 6LoWPAN protocol). Consequently, it is not possible, at present, for a piece of IP equipment such as TV decoder to use the sensor network for routing its own data to a second piece of equipment, such as a residential gateway acting as an "exit point".

This arises in particular because of the fact that IP addresses are managed independently in each network. A piece of IP equipment, e.g. a controller, other than the piece that is declared as the "exit point", which in the present example is the residential gateway, does not know the addressing used in the sensor network; particularly since the topology of the sensor network varies over time.

The invention improves this situation.

To this end, in a functional aspect, the invention provides a method of routing data that includes pieces of IP type equipment referred to as first and second pieces of equipment, the first piece of equipment being suitable for communicating with a management node of a sensor network in which sensors have respective addresses that are generated by said management node, the node also having a function of routing data in the sensor network, the method being characterized in that it comprises the following steps in a router:

a generation step for generating an address for the second piece of equipment;

a verification step for verifying the availability of the address in the sensor network from the management node; and if the address is available, a request step for requesting the management node to add the second piece of equipment in the sensor network.

The invention thus introduces a router having the function of managing the addressing of a piece of IP equipment in co-operation with the sensor network rather than independently of the sensor network as in the state of the art.

The router in question is thus capable of generating an address for a piece of IP equipment that is in compliance with the addressing used in the sensor network.

The IP equipment is thus seen by the management node as a sensor.

By means of the invention and as explained above, since the first piece of equipment is suitable for communicating with the sensor network by being declared as a "exit point" from the sensor network, it becomes possible to route data from the first piece of equipment to said second piece of equipment via the sensor network without modification to the first or second pieces of equipment.

In a particular implementation of the invention, the router uses a prefix for generating the IP address of the second piece of equipment in the sensor network. In this configuration, in this implementation, the above-mentioned generation step is preceded by a reception step for receiving the prefix that is used by the management node, and in that the generation step uses the received prefix. In this way, the router and the management node co-operate by sharing the prefix used in the sensor network under consideration. It then suffices for the router to create an address based on the prefix and then to verify that the address is available in the sensor network.

In general manner, when an address is generated, it has a lifetime. Several situations can be envisaged.

In a particular implementation of the invention, which may be performed as an alternative to or together with the preceding implementation, the address that is generated has an infinite lifetime. This mode is useful when the second piece of equipment is a piece of "fixed" equipment that is not normally moved, and does not normally change its electrical state, unlike sensors; a change of electrical state may be going from a ready-to-use state (ON) to an off state (OFF), changing over from a ready-to-use state (ON) to a standby state, etc. This implementation avoids the second piece of equipment from communicating with the management node after the address of the second piece of equipment has been registered in the sensor network.

It may happen that the prefix used by the management node has a time-limited lifetime. In this configuration, in another particular implementation of the invention, which may be implemented as an alternative to or together with the preceding implementation, the lifetime of the address that is generated is no longer than the lifetime of the prefix. This avoids generating addresses for the second piece of equipment that become incompatible with the sensor network. It should be observed at this point that if the lifetime of the address is shorter than the lifetime of the prefix, the second piece of equipment needs to warn the sensor network, and in particular the management node, to cease routing messages after the expiry of the lifetime of the address.

Independently of the lifetime set for the address, it may happen that the second piece of equipment is not accessible, e.g. because it has been disconnected from the network, whether voluntarily or unexpectedly. In such a configuration, when that occurs, in another implementation of the invention that may be implemented as an alternative to or together with the preceding implementations, the router sends a message to the management node specifying a zero lifetime, so as to stop packets destined for the second piece of equipment being routed. Once more, this mode avoids routing packets via the sensor network pointlessly, specifically in this situation when the second piece of equipment is not accessible; specifically since the lifetime of sensors is often limited.

In a hardware aspect, the invention provides a router suitable for being installed in a computer system including at least two pieces of IP type equipment, referred to as first and second pieces of equipment, the second piece of equipment being suitable for communicating with a management node of a sensor network in which sensors have respective IP addresses that are generated by said management node, the node also having a function of routing data in the sensor network, the router being characterized in that it comprises:
  a generator module for generating an address for the second piece of equipment;
  a verification module for verifying the availability of the address in the sensor network from the management node; and
  if the address is available, a request module for requesting the management node to add the second piece of equipment in the sensor network.

In a hardware aspect, the invention provides a computer system for routing data between two pieces of IP type equipment, referred to as first and second pieces of equipment, the second piece of equipment being suitable for communicating with a management node of a sensor network in which sensors have respective IP addresses that are generated by said management node, the node also having a function of routing data in the sensor network, the system being characterized in that it includes a router as defined above.

In another hardware aspect, the invention provides a computer program including code instructions that perform the steps of the method as defined above, when the program is executed by a processor.

Such a program may use any programming language. It may be downloaded from a communications network and/or it may be recorded on a computer-readable medium.

Naturally, each of these pieces of equipment includes software means such as the above-mentioned computer program instructions, these instructions being executed by physical means such as at least one processor and a working memory.

The invention can be better understood on reading the following description given by way of example and made with reference to the accompanying drawings, in which:

FIG. 6 is an exemplary illustration of a format of a DHCPv6 message.

DETAILED DESCRIPTION OF AN EMBODIMENT ILLUSTRATING THE INVENTION

Figure 1:
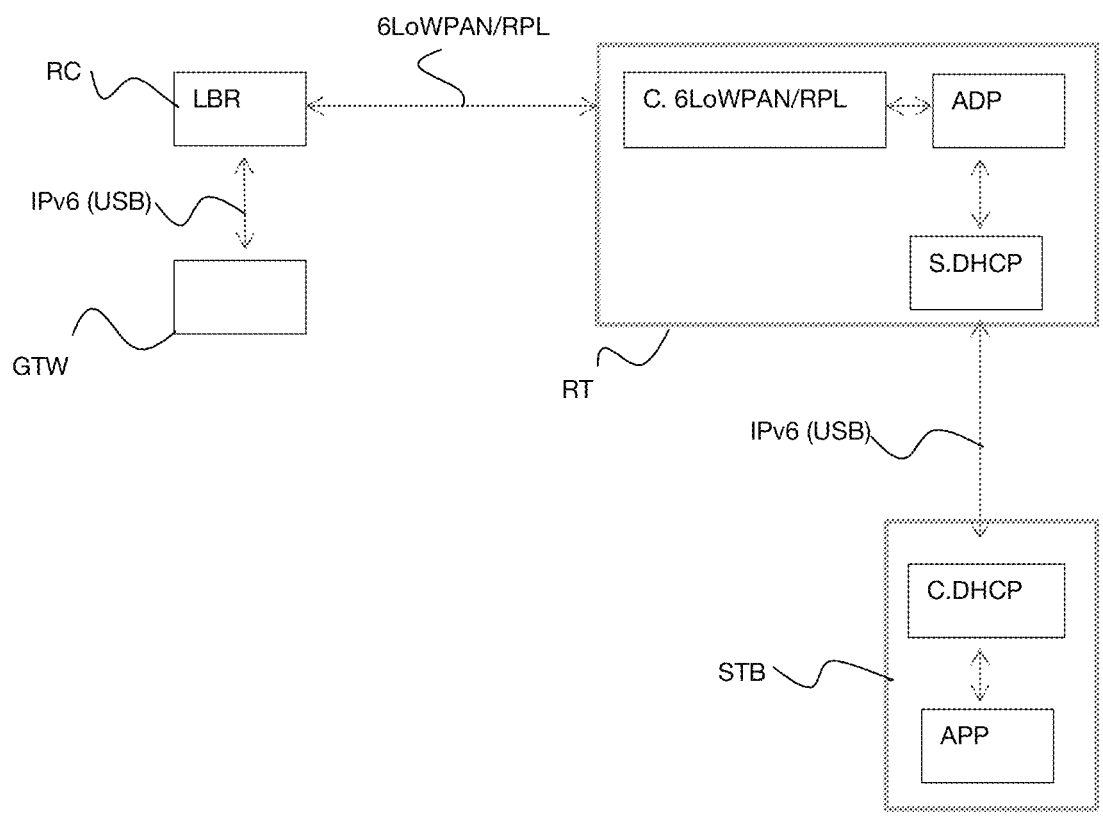
FIG. 1 shows a computer system illustrating an embodiment of the invention.

FIG. 1 shows a system SYS comprising a residential network including a first piece of equipment represented by a residential gateway GTW and a second piece of equipment represented by digital TV decoder means STB.

In such a network, the gateway GTW usually has an Ethernet type interface enabling it to dialog in wired mode over the network using an IP type communication protocol, and a WiFi interface for dialoging wirelessly using the same IP protocol.

In this example, the gateway GTW and the decoder STB communicate via a WiFi interface.

The system also includes a sensor network RC including a low power and lossy network border router (LBR) node, which serves to manage the prefix of the IPv6 address. Such nodes generate a neighbor cache entry (NCE) table listing all of the addresses of the 6LoWPAN type sensor network. On being solicited, if an address is not in the cache, it is considered as being valid and is stored together with a lifetime (LF) value. As explained below in this description, an address managed by this node has a lifetime LF1.

It should be recalled that a sensor network is also known to the person skilled in the art as a low power and link network (LLN) or as a low wireless personal area network (LoWPAN).

Figure 2:
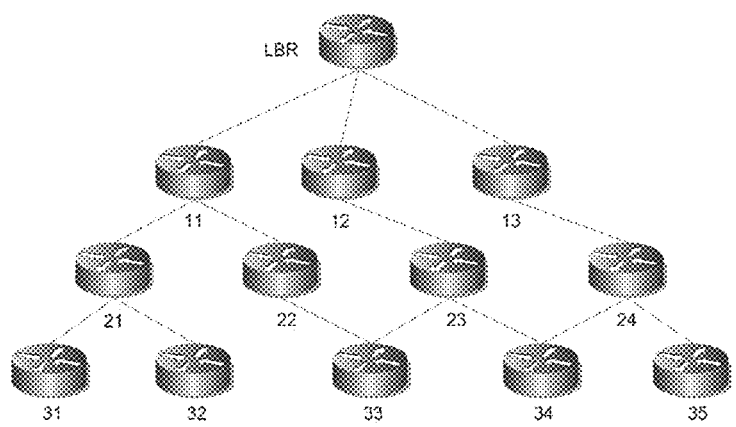
FIG. 2 is a diagrammatic view of the topology of networks of sensors in the state of the art.

A sensor network is characterized by a set of nodes (shown in FIG. 2) each serving to collect certain items of physical data (temperature, pollution, detecting movement, measuring electricity consumption, . . . ). By extension, these nodes perform an activator role, being capable of triggering an event (opening a door, switching on a light, managing energy, . . . ). A building may include several hundreds of such sensors that communicate using the IPv6 protocol. Most of the sensors are not connected to the electricity network and are therefore powered by battery only. The idea is to guarantee the longest possible battery life for such sensors since they are generally in locations that are difficult to access. By way of example, the sensors placed on water meters need to have a lifetime of about ten years.

The present invention introduces a piece of equipment referred to below by the term "router" and given the reference RT in the figures. This equipment acts as an interface between a conventional IPv6 link and a low power network of the 6LoWPAN/RPL type. To do this, the router RT includes an IPv6 type DHCP server given reference S.DHCP, and the decoder is fitted with an IPv6 type DHCP client given reference C.DHCP. Consequently, IPv6 client/server communication is possible between the decoder STB and the router RT. The decoder also includes an application APP, e.g. a multimedia type application.

The router RT includes a client C.6LoWPAN/RPL. This client provides communication between the router RT and the pieces of equipment of the sensor network RC, and specifically the management node LBR. It should be recalled that RPL corresponds to "IPv6 routing protocol for low power and lossy networks".

The router RT also includes an adaptor module ADA. The adaptor module serves to manage communication with the sensor network via the client C.6LoWPAN/RPL, and with the decoder STB via the server S.DHCP as a function of messages received by the router RT. In addition, in the event of the client C.DHCP being of the IPv4 type, the adaptor module is also used to convert the IPv4 address into an IPv6 address compatible with the sensor network.

The gateway GTW is the entry point of the sensor network RC. In this example, communication between the gateway and the management node LBR takes place via an IPv6 link (e.g. a universal serial bus (USB) link).

Figure 3:
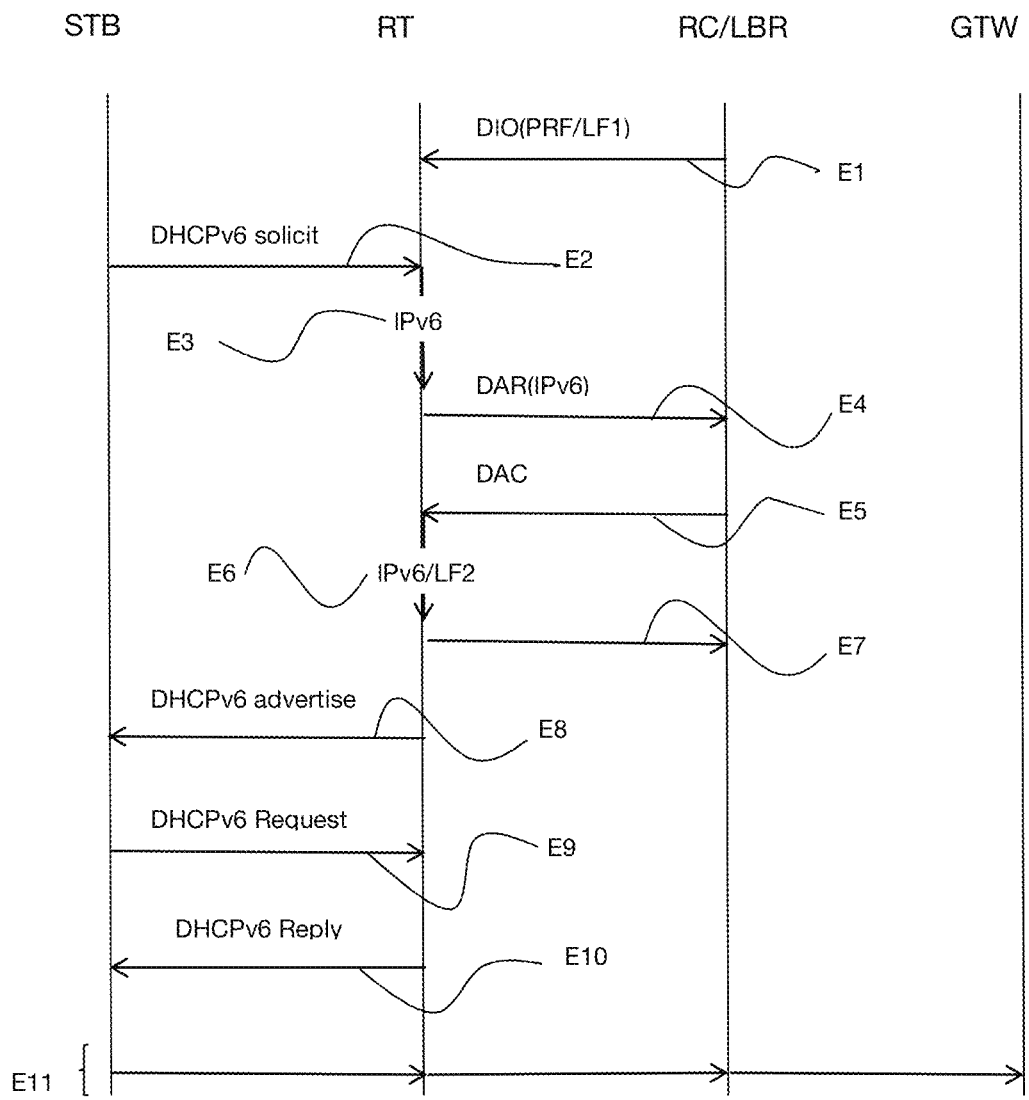
FIG. 3 is a diagrammatic view showing the exchanges of data between the various pieces of equipment in an implementation.

FIG. 3 shows the exchanges of messages between the various pieces of equipment of the system SYS in an implementation of the method of the invention. In this implementation, it is considered that a user has both a residential gateway and a digital TV decoder, and that these pieces of equipment are connected together by WiFi in order to convey TV streams. The user also have sensors (smoke or presence detectors, lamps, bracelets, . . . ) that communicate with one another using a 6LoWPAN/RPL network. Furthermore, the gateway and the decoder also has two USB keys that enable them to join the sensor network. In this example, the router RT of the invention is installed in a USB key.

The other USB key connected to the gateway serves to provide interconnection between the gateway and the sensor network. The USB interface is the default route for messages coming from the sensor network and going to an external destination. This key also corresponds to the equipment LBR that uses a DIO message as described below with reference to the implementation to broadcast the prefix PRF used in the sensor network.

When the user puts the digital TV decoder in standby mode, it switches off its WiFi card in order to reduce its power consumption. Under such circumstances, and by means of the invention, the decoder and the gateway remain capable of maintaining their connection by using the sensor network.

In FIG. 3, the steps of this implementation are given references E1 to E11.

During a first step E1, the management node LBR transmits a message DIO to the router RT, which message includes the prefix PRF that is used for managing addresses in the sensor network, together with the lifetime LF1 of the prefix, referred to as the first lifetime. By way of example, the node LBR supplies the prefix of the IP addresses that it uses, e.g. 2a01:: on 64 bits.

During a second step E2, the server S.DHCP (v4 or v6) present in the router RT and the client C.DHCP present in the decoder STB are executed. As a result of executing the DHCP client and the server, a "DHCPv6 Solicit" message is transmitted by the decoder STB to the router RT.

On receiving the DHCP message, the server S.DHCP of the router RT acts in a third step E3 to calculate an IPv6 address for the decoder STB on the basis of the prefix PRF supplied by the management node LBR, e.g. 2a01::2.

During a fourth step E4, a verification test is performed to verify whether or not the IPv6 address is available in the sensor network RC, since this address might have already been allocated to a sensor of the sensor network. For this purpose, in this example, a duplicate address request (DAR) message is sent over the 6LoWPAN network from the router RT to the management node LBR.

With reference to the RFC6557 standard, a portion of the DAR message may be written as follows:
Field Type: 157
Code: 0
Status: 0
Registration Lifetime: LF2 (to specify a lifetime)
EUI-64: EUI-64 identifier of the interface
Registered address: 2a01::2 (IPv6 address to be tested)

Thereafter, during a fifth step E5, a duplicate confirmation (DAC) message is transmitted from the management node LBR to the router RT. This message DAC indicates whether or not the address is available.

With reference to the RFC6557 standard, a portion of the message DAR may be written as follows:
IPv6 src: address of the LBR
IPv6 dest: 2a01::2 (IPv6 address to be tested)
Field Type: 158
Status: gives the status of the registration
EUI-64: EUI-64 identifier At this stage, if the address is not available because it has already been allocated to a sensor, the same steps are executed once more with a new IPv6 address, in compliance with the prefix used by the management node LBR, and until the address that is generated is an address that is available in the sensor network.

If the address is available, the method continues as follows:

During a sixth step E6, a lifetime LF2 of the address, referred to as the second lifetime, is allocated to the IPv6 address. By way of example, this lifetime is set by the router RT.

During a seventh step E7, a destination advertisement object (DAO) message present in the RPL with the headers "Target Prefix" and "Transit Information" containing respectively the IPv6 address of the decoder and the second lifetime LF2, is transmitted to the sensor network RC, and in particular to the module LBR so that it adds the new piece of equipment to its sensor network. The node LBR stores this new address in its database.

In this example, and with reference to the RFC6557 Target Option standard, the message DAO includes in particular two options, namely: "Target Option" and "Transit Information Option".

Figure 4:
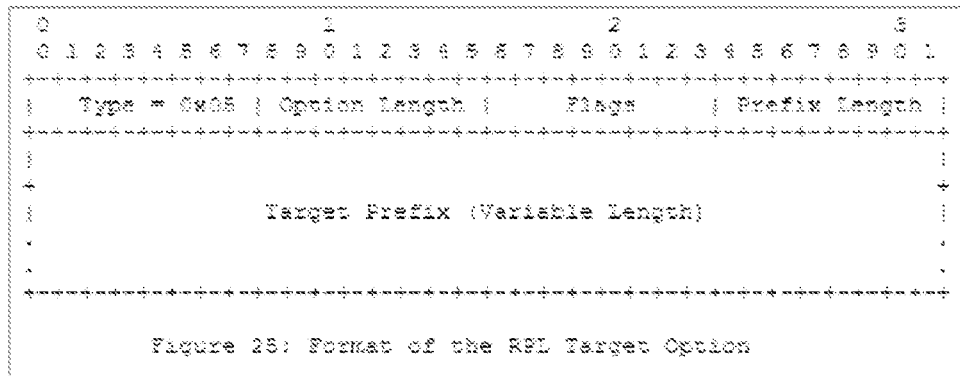
FIG. 4 is an exemplary illustration of a format of a "Target Option."

In the option "Target Option", the field "Target Prefix is filled with the IPv6 address that has been generated, corresponding to the decoder of the decoder (see FIG. 4 for reference).

Figure 5:
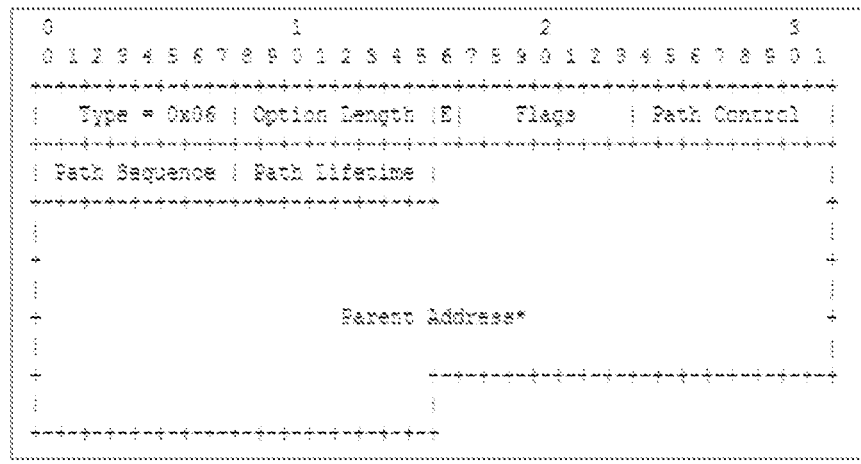
FIG. 5 is an exemplary illustration of a format of a "Transit Information Option."

In the option "Transit information option", the field "Path Lifetime" is filled-in with the lifetime LF2 (see FIG. 5 for reference).

During an eighth step E8, a message "DHCPv6 Advertise" is transmitted by the server S.DHCP to the client C.DHCP of the decoder STB in order to confirm that it is present in the sensor network. Thereafter, during a ninth step E9, the decoder STB responds by sending a message "DCHPv6 Request" to request its connection identifiers, and the server replies during a tenth step E10 by a message "DHCPv6 Reply" to the decoder STB containing its IPv6 address.

FIG. 6 illustrates an example of DHCPv6 messages used in the RFC6557 standard.

At this stage, the decoder can communicate with the gateway GTW via the sensor network.

On receiving a packet sent by the gateway GTW to the decoder STB, the packet in question is routed to the decoder STB via the sensor network RC; more precisely, the gateway sends a packet to the sensor network via the conventional IPv6 link (a USB link in this example); thereafter, the packet passes through the sensor network RC and then via the router RT. The router RT then transmits the packet to the decoder STB via the conventional IPv6 link (a USB link in this example). These steps are given reference E11 in FIG. 2.

In the same way, the decoder STB can transmit a data packet to the gateway GTW. The packet in question is transmitted to the router RT, then to the sensor network, and then to the gateway.

The above-described implementation may be subjected to variants.

In a first variant, the second lifetime LF2 may vary depending on the implementation.

Firstly, this lifetime may be infinite if that prevents the STB from needing to inform the router RT that the address has expired.

Secondly, this second lifetime may be equal to the lifetime of the prefix (LF1=LF2). This avoids generating an address with a prefix that is no longer used in the sensor network.

Thirdly, the second lifetime LF2 may be shorter than the first lifetime LF1 (LF2<LF1). The router RT then needs to warn the sensor network to cease routing messages after the lifetime LF2. The node LBR then updates its address base.

Independently of the fixed lifetime LF2, the decoder can subsequently be inaccessible for various reasons, e.g. because it has been disconnected or because it is no longer operating. In a second variant, in order to manage disconnection of the decoder, when the router receives a DHCP release request from the decoder STB, or when the router RT detects that the USB has been disconnected from the decoder, the router RT sends a DAO message (refer to the standard RFC6550) to the sensor network RC, including:
  a header "Transit information" specifying a zero lifetime LF2 on the sensor network in order to eliminate routing packets destined for the decoder STB; and
  a header "Target" indicating the address of the piece of equipment, the decoder STB in this example, for which the route is to be deleted.

This avoids the router RT transmitting data destined for equipment that has been disconnected. This avoids consuming resources pointlessly in the sensor network.

The term "module" may correspond equally well to a software component or to a hardware component or to a unit comprising both hardware and software components, and a software component may itself correspond to one or more computer programs or subprograms, or more generally to any program element suitable for performing a function or a set of functions as described for the modules concerned. In the same manner, a hardware component corresponds to any element of a hardware unit suitable for performing a function or a set of functions for the module concerned (integrated circuit, smart card, memory card, etc.).

The invention claimed is:

1. A method of routing data between a home gateway and a local network equipment adapted to communicate between one another via a home network managed by said home gateway, the home gateway suitable for communicating with a sensor network through a management node in which sensors have respective IP addresses in the sensor network that are generated by said management node, the management node also having a function of routing data in the sensor network, the method comprising, in a router:
  receiving from the management node a first message, the first message including a prefix and a first lifetime of the prefix;
  generating an address for the local network equipment;
  verifying the availability of the address in the sensor network from the management node; and
  upon verification that the address is available, transmitting to the management node a second message, the second message including the address of the local network equipment and a second lifetime of the address, in order to add the local network equipment in the sensor network to allow the home gateway to communicate with the local network equipment either via the home network or the sensor network.

2. A method according to claim 1, wherein the router uses the prefix for generating the address of the local network equipment in the sensor network, wherein the method additionally includes receiving the prefix that is used by the management node (LBR) prior to generating the address for the local network equipment equipment, and wherein generating the address for the local network equipment equipment uses the received prefix.

3. A method according to claim 1, wherein the second lifetime of the address is an infinite lifetime.

4. A method according to claim 2, wherein the second lifetime of the address is no longer than the first lifetime of the prefix.

5. A method according to claim 1, wherein if the local network equipment equipment is inaccessible, the router transmits a message to the management node specifying a zero lifetime.

6. A router suitable for being installed in a computer system including at least a home gateway and a local network equipment adapted to communicate between each other via a home network managed by the home gateway, the home gateway suitable for communicating with a sensor network through a management node in which sensors have respective IP addresses in the sensor network that are generated by said management node, the management node also having a function of routing data in the sensor network, the router comprising a processor configured to:
  receive from the management node a first message, the first message including a prefix and a first lifetime of the prefix;
  generate an address for the local network equipment;
  verify the availability of the address in the sensor network from the management node; and
  upon verification that the address is available, transmit to the management node a second message, the second message including the address of the local network equipment and a second lifetime of the address, in order to add the second piece of equipment in the sensor network to allow the home gateway to communicate with the local network IP type equipment either via the home network or the sensor network.

7. A system for routing data between a home gateway and a local network equipment, the home gateway suitable for communicating with a sensor network through a management node in which sensors have respective IP addresses that are generated by said management node, the management node also having a function of routing data in the sensor network, the system including the a home gateway and a local network equipment and the router of claim 6.

* * * * *